United States Patent
Kaluskar et al.

(10) Patent No.: US 7,502,824 B2
(45) Date of Patent: Mar. 10, 2009

(54) DATABASE SHUTDOWN WITH SESSION MIGRATION

(75) Inventors: Sanjay Kaluskar, Menlo Park, CA (US); Dmitry Frumkin, Mountain View, CA (US); Sreenivas Gollapudi, Cupertino, CA (US); Srinath Krishnaswamy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 188 days.

(21) Appl. No.: 11/415,557

(22) Filed: May 1, 2006

(65) Prior Publication Data

US 2006/0200454 A1 Sep. 7, 2006

Related U.S. Application Data

(63) Continuation-in-part of application No. 10/917,953, filed on Aug. 12, 2004.

(51) Int. Cl.
*G06F 15/16* (2006.01)
*G06F 12/00* (2006.01)

(52) U.S. Cl. ........................................ 709/203

(58) Field of Classification Search ................ 709/203, 709/217, 218, 250, 229, 223, 227
See application file for complete search history.

(56) References Cited

U.S. PATENT DOCUMENTS

| | | |
|---|---|---|
| 3,444,528 A | 5/1969 | Lovell et al. |
| 4,586,134 A | 4/1986 | Norstedt |
| 4,868,832 A | 9/1989 | Marrington et al. |
| 5,047,922 A | 9/1991 | Borkar |
| 5,157,663 A | 10/1992 | Major et al. |
| 5,179,660 A | 1/1993 | Devany et al. |
| 5,247,664 A | 9/1993 | Thompson et al. |
| 5,247,671 A | 9/1993 | Adkins et al. |
| 5,289,461 A | 2/1994 | de Nijs |
| 5,319,754 A | 6/1994 | Meinecke et al. |
| 5,392,285 A | 2/1995 | Kurts |
| 5,448,559 A | 9/1995 | Hayter et al. |
| 5,530,905 A | 6/1996 | Nichols et al. |
| 5,535,326 A | 7/1996 | Baskey et al. |
| 5,544,313 A | 8/1996 | Shachnai et al. |
| 5,553,242 A | 9/1996 | Russell et al. |

(Continued)

FOREIGN PATENT DOCUMENTS

EP 0 942 363 A2 9/1999

(Continued)

OTHER PUBLICATIONS

Patent Cooperation Treaty, "Notification of Transmittal of the International Preliminary Report on Patentability," PCT/US2004/026405, dated Oct. 10, 2006, 7 pages.

(Continued)

*Primary Examiner*—Zarni Maung
(74) *Attorney, Agent, or Firm*—Hickman Palermo Truong & Becker LLP (57) ABSTRACT

When a request for a shutdown of a server (e.g. database server) is requested, existing sessions established for the clients are migrated to another server. Some sessions may not be migrated for various reasons; these sessions may be terminated without migrating them.

20 Claims, 4 Drawing Sheets

U.S. PATENT DOCUMENTS

| | | |
|---|---|---|
| 5,566,225 A | 10/1996 | Haas |
| 5,566,297 A | 10/1996 | Devarakonda et al. |
| 5,596,720 A | 1/1997 | Hamada et al. |
| 5,596,745 A | 1/1997 | Lai et al. |
| 5,598,536 A | 1/1997 | Slaughter, III et al. |
| 5,600,722 A | 2/1997 | Yamaguchi et al. |
| 5,617,540 A | 4/1997 | Civanlar et al. |
| 5,633,861 A | 5/1997 | Hanson et al. |
| 5,633,999 A | 5/1997 | Clowes et al. |
| 5,642,515 A | 6/1997 | Jones et al. |
| 5,652,908 A | 7/1997 | Douglas et al. |
| 5,666,479 A | 9/1997 | Kashimoto et al. |
| 5,682,534 A | 10/1997 | Kapoor et al. |
| 5,684,800 A | 11/1997 | Dobbins et al. |
| 5,696,895 A | 12/1997 | Hemphill et al. |
| 5,721,918 A | 2/1998 | Nilsson et al. |
| 5,734,659 A | 3/1998 | Mann et al. |
| 5,734,896 A | 3/1998 | Rizvi et al. |
| 5,740,175 A | 4/1998 | Wakeman et al. |
| 5,761,507 A | 6/1998 | Govett |
| 5,771,349 A | 6/1998 | Picazo, Jr. et al. |
| 5,774,660 A | 6/1998 | Brendel et al. |
| 5,774,668 A | 6/1998 | Choquier et al. |
| 5,784,630 A | 7/1998 | Saito et al. |
| 5,790,800 A | 8/1998 | Gauvin et al. |
| 5,796,934 A | 8/1998 | Bhanot et al. |
| 5,796,941 A | 8/1998 | Lita |
| 5,796,999 A | 8/1998 | Azagury et al. |
| 5,805,816 A | 9/1998 | Picazo, Jr. et al. |
| 5,805,827 A | 9/1998 | Chau et al. |
| 5,805,920 A | 9/1998 | Sprenkle et al. |
| 5,819,019 A | 10/1998 | Nelson |
| 5,819,298 A | 10/1998 | Wong et al. |
| 5,828,879 A | 10/1998 | Bennett |
| 5,832,483 A | 11/1998 | Barker |
| 5,850,507 A | 12/1998 | Ngai et al. |
| 5,862,362 A | 1/1999 | Somasegar et al. |
| 5,867,713 A | 2/1999 | Shrader et al. |
| 5,870,545 A | 2/1999 | Davis et al. |
| 5,870,746 A | 2/1999 | Knutson et al. |
| 5,890,167 A | 3/1999 | Bridge, Jr. et al. |
| 5,890,169 A | 3/1999 | Wong et al. |
| 5,890,963 A | 4/1999 | Yen |
| 5,918,059 A * | 6/1999 | Tavallaei et al. ............ 713/300 |
| 5,944,823 A | 8/1999 | Jade et al. |
| 5,951,694 A | 9/1999 | Choquier et al. |
| 5,963,556 A | 10/1999 | Varghese et al. |
| 5,974,463 A | 10/1999 | Warrier et al. |
| 5,978,849 A | 11/1999 | Khanna |
| 5,987,430 A | 11/1999 | Van Horne et al. |
| 6,006,264 A | 12/1999 | Colby et al. |
| 6,035,379 A | 3/2000 | Raju et al. |
| 6,035,412 A | 3/2000 | Tamer et al. |
| 6,038,677 A | 3/2000 | Lawlor et al. |
| 6,041,357 A | 3/2000 | Kunzelman et al. |
| 6,047,323 A | 4/2000 | Krause |
| 6,088,728 A | 7/2000 | Bellemore et al. |
| 6,178,529 B1 | 1/2001 | Short et al. |
| 6,243,751 B1 | 6/2001 | Chatterjee et al. |
| 6,327,622 B1 | 12/2001 | Jindal et al. |
| 6,442,568 B1 | 8/2002 | Velasco et al. |
| 6,556,659 B1 | 4/2003 | Bowman-Amuah |
| 6,587,866 B1 | 7/2003 | Modi et al. |
| 6,601,101 B1 * | 7/2003 | Lee et al. .................. 709/227 |
| 6,604,110 B1 | 8/2003 | Savage et al. |
| 6,667,751 B1 | 12/2003 | Wynn et al. |
| 6,691,155 B2 | 2/2004 | Gottfried |
| 6,728,748 B1 | 4/2004 | Mangipudi et al. |
| 6,816,907 B1 | 11/2004 | Mei et al. |
| 6,925,477 B1 | 8/2005 | Champagne et al. |
| 7,024,394 B1 | 4/2006 | Ashour et al. |
| 7,058,957 B1 | 6/2006 | Nguyen |
| 7,107,294 B2 | 9/2006 | Romanufa et al. |
| 7,174,379 B2 | 2/2007 | Agarwal et al. |
| 7,178,050 B2 * | 2/2007 | Fung et al. .................. 714/4 |
| 7,263,590 B1 | 8/2007 | Todd et al. |
| 7,269,157 B2 | 9/2007 | Klinker et al. |
| 2001/0047270 A1 | 11/2001 | Gusick et al. |
| 2001/0056493 A1 | 12/2001 | Mineo |
| 2002/0073139 A1 | 6/2002 | Hawkins et al. |
| 2002/0129157 A1 | 9/2002 | Varsano |
| 2002/0161896 A1 | 10/2002 | Wen et al. |
| 2002/0194015 A1 | 12/2002 | Gordon et al. |
| 2003/0005028 A1 | 1/2003 | Dritschler et al. |
| 2003/0007497 A1 | 1/2003 | March et al. |
| 2003/0014523 A1 | 1/2003 | Teloh et al. |
| 2003/0063122 A1 | 4/2003 | Cichowlas et al. |
| 2003/0088671 A1 | 5/2003 | Klinker et al. |
| 2003/0108052 A1 | 6/2003 | Inoue et al. |
| 2003/0135642 A1 | 7/2003 | Benedetto et al. |
| 2003/0208523 A1 | 11/2003 | Gopalan et al. |
| 2003/0217159 A1 | 11/2003 | Schramm-Apple et al. |
| 2003/0236834 A1 | 12/2003 | Gottfried |
| 2004/0024979 A1 | 2/2004 | Kaminsky et al. |
| 2004/0078602 A1 | 4/2004 | Rothbarth et al. |
| 2004/0111506 A1 | 6/2004 | Kundu et al. |
| 2004/0117794 A1 | 6/2004 | Kundu |
| 2004/0176996 A1 | 9/2004 | Powers et al. |
| 2004/0268357 A1 | 12/2004 | Joy et al. |
| 2005/0021771 A1 * | 1/2005 | Kaehn et al. ............... 709/228 |
| 2005/0050116 A1 | 3/2005 | Gross et al. |
| 2005/0132222 A1 | 6/2005 | Petrovic |
| 2005/0165925 A1 | 7/2005 | Dan et al. |
| 2005/0239476 A1 | 10/2005 | Betrabet et al. |
| 2005/0267965 A1 * | 12/2005 | Heller ........................ 709/224 |
| 2006/0036617 A1 | 2/2006 | Bastawala et al. |
| 2006/0059228 A1 | 3/2006 | Kasamsetty et al. |
| 2006/0184535 A1 | 8/2006 | Kaluskar et al. |
| 2007/0226323 A1 * | 9/2007 | Halpern ..................... 709/222 |

FOREIGN PATENT DOCUMENTS

| | | |
|---|---|---|
| EP | 0 942 363 A3 | 9/1999 |
| EP | 0 992 909 A2 | 4/2000 |
| WO | WO 02/05116 A2 | 1/2002 |
| WO | WO 02/07037 A | 1/2002 |
| WO | WO 02/07037 A1 | 1/2002 |
| WO | WO 02/097676 A2 | 12/2002 |
| WO | WO 03/014928 A1 | 2/2003 |
| WO | WO 03/014929 A1 | 2/2003 |
| WO | WO 03/062983 A2 | 7/2003 |

OTHER PUBLICATIONS

Amended Claims, PCT/US2004/026405, dated Apr. 6, 2006, 4 pages (attached).

Chase, Jeffrey S. et al., "Dynamic Virtual Clusters in a Grid Site Manager," Proceedings of the 12th IEEE International Symposium on High Performance Distributed Computing (HPDC'03), 2003, IEEE, pp. 90-100.

Coulouris et al., "Distributed Systems, Concepts and Design", 1994, Addison-Wesley.

Gunther, Oliver, et al., "MMM: A Web-Based System for Sharing Statistical Computing Modules," IEEE, May-Jun. 1997, vol. 1, issue 3, pp. 59-68.

IBM, "Local Area Network Server Replacement Procedure" IBM Technical Disclosure Bulletin, Jan. 1995.

Kokku, Ravi et al., "Half-pipe Anchoring: An Efficient Technique for Multiple Connection Handoff," Proceedings 10th International Conference on Network Protocols, Nov. 12, 2002, XP010632563, 10 pages.

Kurakawa, Kei et al., "Life Cycle Design Support Based on Environmental Information Sharing," IEEE, Feb. 1-3, 1999, Proceedings EcoDesign '99, First International Symposium, pp. 138-142.

Lin, Ying-Dar et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

Satyanarayanan, Mahadev, "CODA: A Highly Available File System for a Distributed Workstation Environment", IEEE Transactions on Computers, vol. 39, No. 4, pp. 447-459, Apr. 1990.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

Tewari, Renu, et al., "Highly Availability in Clustered Multimedia Servers", (IEEE), Mar. 1996, pp. 645-654.

International Searching Authority, "Notification of Transmittal of the International Search Report or the Declaration," for Application No. PCT/US03/23747, dated May 25, 2004, 6 pages.

Current Claims in PCT application, International Application No. PCT/US03/23747, 13 pages.

International Searching Authority, "Notification of Transmittal of the International Search Report and the Written Opinion of the International Searching Authority, or the Declaration," Application No. PCT/US2004/026570, Nov. 12, 2004, 13 pages.

Current Claims of International Application No. PCT/US2004/026570, 4 pages.

International Preliminary Examining Authority, "Written Opinion of the International Preliminary Examining Authority," Application No. PCT/US04/26570, Jun. 7, 2005, 4 pages.

International Searching Authority, "Notification of Transmittal of the International Search Report and the Written Opinion of the International Searching Authority, or the Declaration," Application No. PCT/US2004/026389, Aug. 4, 2005, 13 pages.

Current Claims for International Application No. PCT/US2004/026389, pp. 45-50.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5.

International Searching Authority, "Notification of Transmittal of the International Search Report and the Written Opinion of the International Searching Authority, or the Declaration," Application No. PCT/US2004/025805, dated Dec. 3, 2004, 12 pages.

Current Claims of International Application No. PCT/US2004/025805, 8 pages.

International Preliminary Examining Authority, "Notification of Transmittal of International Preliminary Report on Patentability," PCT/US2004/025805, dated Nov. 18, 2005, 16 pages.

International Searching Authority, "Notification of Transmittal of the International Search Report and the Written Opinion of the International Searching Authority, or the Declaration," PCT/US2004/026405, dated Jan. 6, 2006, 13 pages.

Current Claims, PCT/US2004/026405, 7 pages.

International Searching Authority, "Notification of the Transmittal of the International Search Report and the Written Opinion of the International Searching Authority, or the Declaration", PCT/US2004/026405, dated Aug. 19, 2005, 5 pages.

Claims, PCT/US2004/026405, 7 pages.

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

"Notice of Allowance and Fee Due" received in U.S. Appl. No. 10/917,843 received on Apr. 1, 2008 (7 pages).

European Patent Office, "Communication Pursuant to Article 96(2) EPC," App. No. 04781256.3 (50277-2985), dated Feb. 2, 2007, 4 pages.

Claims, App. No. 04781256.3 (50277-2985), pp. 34-36.

Kokku, Ravi et al., "Half-Pipe Anchoring: An Efficient Technique for Multiple Connection Handoff," Proceedings of the 10th International Conference of Network Protocols, Nov. 12, 2002, 10 pages.

"Office Action" received in U.S. Appl. No. 11/057,043 dated Apr. 9, 2008, 19 pages.

"Office Action" received in related case U.S. Appl. No. 10/917,661, filed Aug. 12, 2004, 9 pages.

"Office Action" received in related case U.S. Appl. No. 10/918,056, filed Aug. 12, 2004, 9 pages.

"Office Action" received in related case U.S. Appl. No. 10/917,687, filed Aug. 12, 2004, 9 pages.

U.S. Appl. No. 10/917,661, filed Aug. 12, 2004.

"Office Action" received in U.S. Appl. No. 11/057,043 dated Apr. 9, 2008, 19 pages.

* cited by examiner

DATABASE SHUTDOWN WITH SESSION MIGRATION

RELATED APPLICATIONS

The present application is a continuation-in-part of U.S. application Ser. No. 10/917,953, Transparent Session Migration Across Servers, filed by Sanjay Kaluskar, et al. on Aug. 12, 2004, and incorporated herein by reference.

The present application is related to U.S. application Ser. No. 10/918,055, Incremental Run-Time Session Balancing in a Multi-Node System, filed by Lakshminarayanan Chidambaran, et al. on Aug. 12, 2004, and is incorporated herein by reference.

The present application is related to U.S. application Ser. No. 10/917,715, Measuring Workload by Service, filed by Carol Colrain, et al. on Aug. 12, 2004, and is incorporated herein by reference.

FIELD OF THE INVENTION

The present invention relates to administration of multi-node computer systems, and in particular, managing the shut down of nodes within the multi-node computer system.

BACKGROUND

For many business enterprises, it is important to have uninterrupted access or use of a database. On the other hand, a database server managing access to a database needs to be shutdown occasionally for various reasons. One common reason is that a database server requires either hardware and/or software maintenance. While the database server is shut down, the database is not available to clients via the database server. An important problem to managing access to a database is to achieve uninterrupted availability of the database while allowing a database server to be occasionally shut down.

An effective approach for this problem is to use multiple database servers for access and management of a database. The availability of a database persists even though one of the database servers is shutdown.

When shutting down a database server, one issue with which to contend is how to handle existing sessions that already exist on the database server and how to handle requests for new sessions made after the database server commences shutting down. The requests for new sessions are handled effectively by establishing the new sessions on a database server that is not being shut down. Handling the existing sessions is problematic for reasons that stem from the need to terminate existing sessions and how the existing sessions are terminated.

The existing sessions are terminated in various ways. The sessions may be terminated by waiting for the user for which the session is established to terminate the session, or by forcibly terminating the session before the session is user-terminated. The former has the disadvantage of deferring shutdown for arbitrary and possibly prolonged periods of time. The latter has the disadvantage of being more disruptive to a user and/or a client application of the database.

One measure that can reduce the impact on existing sessions is to, in advance of shutdown, direct sessions away for the database server to be shut down to other database servers that will not be shut down. While this measure reduces the number of existing sessions impacted, the measure does not guarantee that there is no waiting for user termination or that a session may not have to be forcibly terminated.

Based on foregoing, there is a need for a new approach to shutting a database server.

The approaches described in this section are approaches that could be pursued, but not necessarily approaches that have been previously conceived or pursued. Therefore, unless otherwise indicated, it should not be assumed that any of the approaches described in the section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are novel techniques for shutting down a server within a multi-node computer system in a way that can minimize delay in shutting down the server and that can minimize interruption to end users or clients of the server. While the techniques are described in the context of a database system comprising multiple database servers, the techniques may be used for other types of server. According to the techniques, when a request to shutdown a server is made, existing sessions already established for clients are migrated to another server. Some of these sessions may not be migrated for various reasons; these sessions may be terminated in lieu of migrating them.

Figure 1:
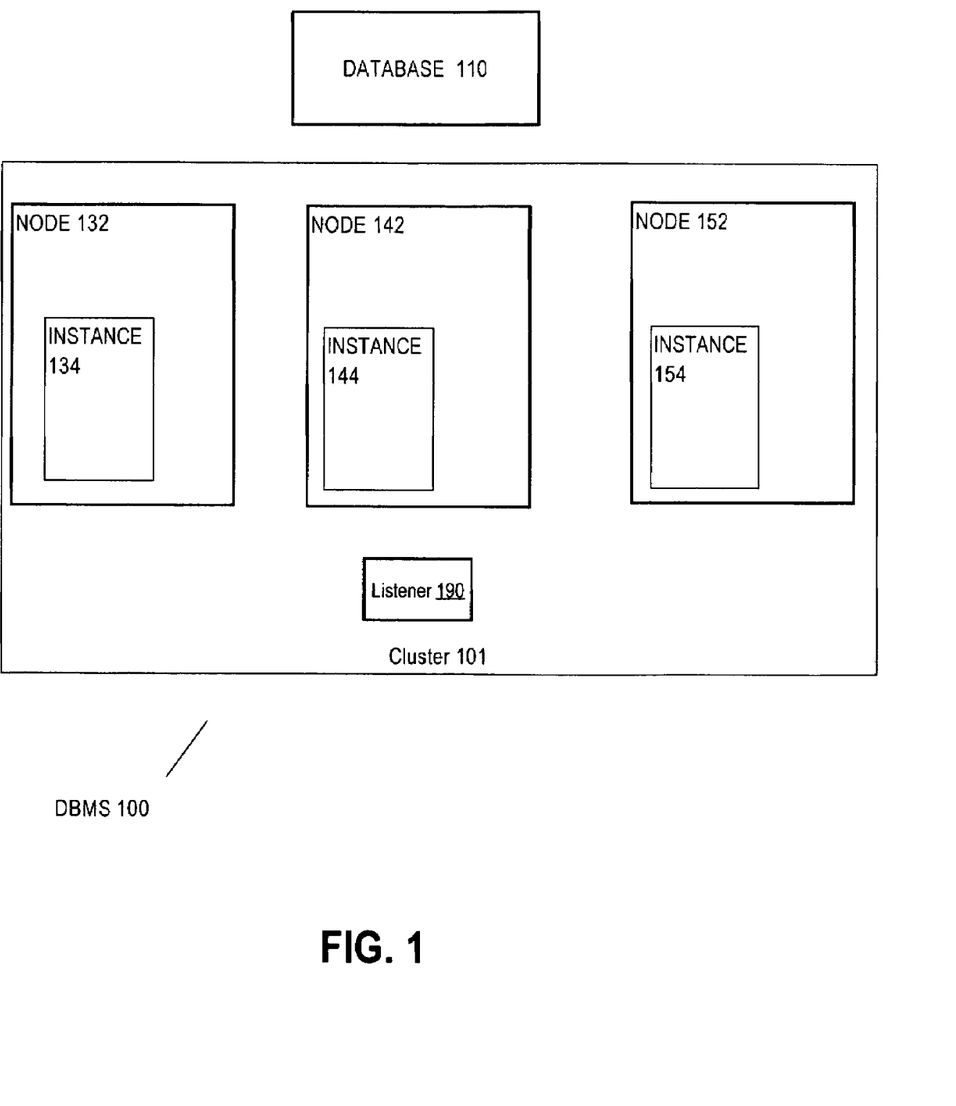
FIG. 1 is diagram depicting a multi-node computer system according to an embodiment of the presenting invention.

FIG. 1 shows a multi-node computer system that may be used to implement an embodiment of the present invention. Referring to FIG. 1, it shows multi-node DBMS 100, which resides on cluster 101. A cluster is a set of nodes that provides some degree of shared storage (e.g. shared access to a set of disk drives) between the nodes in the cluster. The nodes in a cluster may be in the form of computers (e.g. work stations, personal computers) interconnected via a network, and may be part of a grid. A grid is composed of nodes in the form of server blades interconnected with other server blades on a rack. Each server blade is an inclusive computer system, with processor, memory, network connections, and associated electronics on a single motherboard. Cluster 101 includes nodes 132, 142 and 152.

Cluster 101 hosts a multi-node database server for database 110. The multi-node database server comprises database server instances 134, 144 and 154, which are hosted on nodes 132, 142 and 152, respectively.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node computer system can be allocated to running a particular server's software. Each combination of the software and allocation of the resources from a node is a server that is referred to herein as a "server instance" or "instance". Thus, a multi-node server comprises multiple server instances that can run on multiple nodes. Several instances of a multi-node server can even run on the same node. A multi-node database server comprises multiple "database instances", each database instance running on a node, and governing and facilitating access to a particular database. Instances 134, 144 and 154 are database instances of the same multi-node database server.

Sessions

In order for a client to interact with an instance on cluster 100, a session is established for the client. A session, such as a database session, is a particular connection established for a client to a server, such as a database instance, through which the client issues a series of requests (requests for execution of database statements). For each session established on an instance, session state data is maintained that reflects the current state of a session. Such information contains, for example, the identity of the client for which the session is established, and temporary variable values generated by processes executing software within the database session.

A client establishes a session by transmitting a connection request to cluster 101. A listener, such as listener 190, receives the connection request. Listener 190 is a process running on cluster 101 that receives client connection requests and directs them to an instance within cluster 101. Listener 190 may be running on any node within cluster 101. Listener 190 may also be distributed, comprising multiple processes, each process running on a node within cluster 101.

Once the session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a session.

Shutdown Termination Modes for Session

As mentioned before, during shutdown of a server, sessions that may not be migrated are terminated. According to an embodiment of the present invention, sessions that are not migrated may be terminated in one of the four shutdown termination modes. The modes are NORMAL, TRANSACTIONAL, IMMEDIATE, and ABORT. When a session is shutdown using a shutdown termination mode, the session is not migrated to another instance.

NORMAL: In this mode, the database server waits until a client requests that the session be terminated. A session terminated in response to a client requesting the termination is referred to as a user-terminated session.

TRANSACTIONAL: A session is terminated when a transaction being executed within the session is ended by the client, either by committing or aborting the transaction. This mode includes an optional sub-mode, which is local. In this sub-mode, only local transactions are terminated when they reach the end of a transaction. With respect to a database server, a local transaction is a transaction that is being executed by the database server and that is not part of a distributed transaction comprised of multiple transactions being executed by multiple database servers.

IMMEDIATE: A session is terminated and any transaction being executed is aborted and rolled back (i.e. the changes are undone) before the database server shuts down.

ABORT: A session and any transaction being executed is aborted without first rolling back the transaction.

Shutdown Procedure with Attempted Migration

Figure 2:
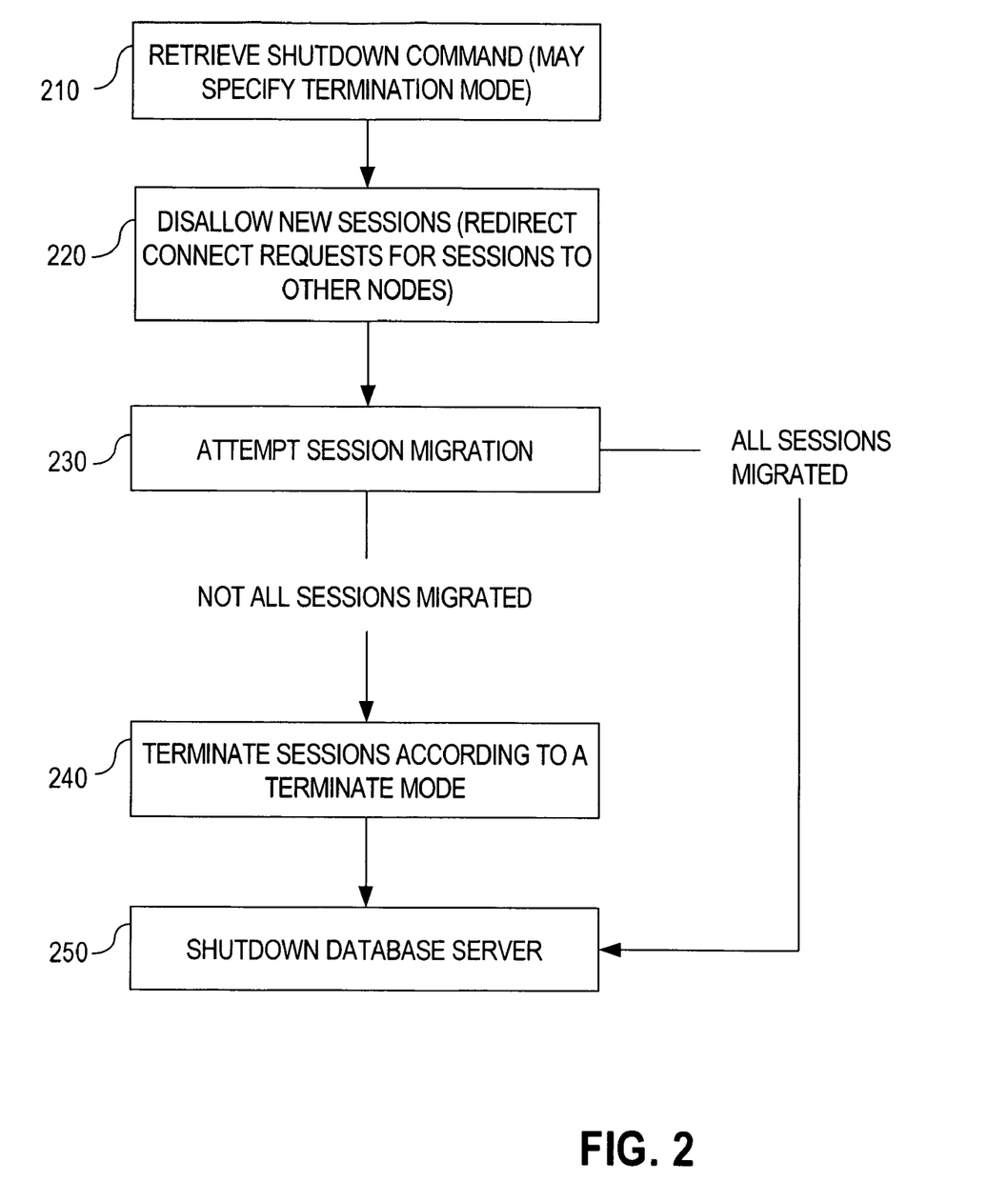
FIG. 2 is a flow chart of a procedure for migrating sessions to shutdown a database system according to an embodiment of the present invention.

FIG. 2 is a diagram depicting a procedure for shutting down a database server according to an embodiment of the present invention.

Referring to FIG. 2, at step 210, a request to shut down a database server is received. The command may specify a shut down termination mode. Alternatively, a default termination mode may be used as the shut down termination mode.

At step 220, new sessions on the database server are disallowed. According to an embodiment, new connection requests for sessions may be directed to other instances. For example, instance 134 may send a message to listener 190 to no longer direct connection requests to instance 134. In response, listener 190 directs connection requests only to other instances within cluster 101.

At step 230, the database server attempts to migrate the sessions to other instances. In the present example, sessions are migrated to the other instances in cluster 101. Preferably, session migration is performed in a way that balances load among the other instances.

It is possible that not all sessions are migrated. This may occur for several reasons. First, the attempt to migrate a session times out, that is, the migration does not occur within the time-out period. Or, the session is of a particular type or has a state that prevents migration of the session.

If all the sessions have been migrated, then execution of the procedure proceeds to step 250. Otherwise, if it is determined to terminate the unmigrated sessions rather than to migrate them, execution proceeds to step 240.

At step 240, remaining sessions not migrated are terminated according to a shutdown termination mode, as established in step 210.

Under some shutdown termination modes, an attempt to migrate remaining session may continue. For example, if the shutdown termination mode is NORMAL, a session may be migrated while waiting for the session to be user terminated.

At step 250, after sessions have been migrated or terminated under a shutdown termination mode, the instance may be shut down. Note, there may be other criteria that must be fulfilled and/or other operations that must be performed before the instance is shut down.

One-Command Shutdown and Migration

FIG. 2 depicts a procedure that is an example of a procedure that migrates sessions and shutdowns a database server in response to receiving one command. This is distinguishable from an approach that might require issuance and receipt of numerous commands to effect the same. One example of such an approach is for an administrator to issue a group of commands to cluster 101. At least one command in the group is issued to direct new sessions to other servers and/or to cause the server simply to stop accepting connection requests. Another command is issued to migrate sessions, or multiple commands may be issued to migrate a particular session to another server. Finally, another command is issued to shutdown the database server.

A command issued to cause an instance in a cluster to shutdown may take various forms. One form may be a single statement issued by an administrator. A statement is the smallest unit of executable instruction that conforms to a computer language, such as a database language like SQL or a proprietary form thereof, that can be executed by a server. The statement may specify, in an argument and/or clause, the shutdown termination mode, and other options for shutting down the server.

Another form of the command may be a single function and/or remote routine invocation of an API ("application programmer interface"). The shutdown termination mode may be specified as a function or routine argument value. Other shut down options may be specified in this way as well.

Session Placement and Load Balancing

To migrate a session, a destination database server for the session is chosen. Choosing a destination to migrate a session is referred to herein as session placement. There are variety factors to consider for session placement.

One such factor is whether a service associated with the session being migrated is hosted at a server that is a candidate as a destination for migration. Service is work of a particular type or category that is hosted on a server for the benefit of one or more clients. One type of service is a database service. Cluster 101 provides a database service for accessing database 110.

Figure 3:
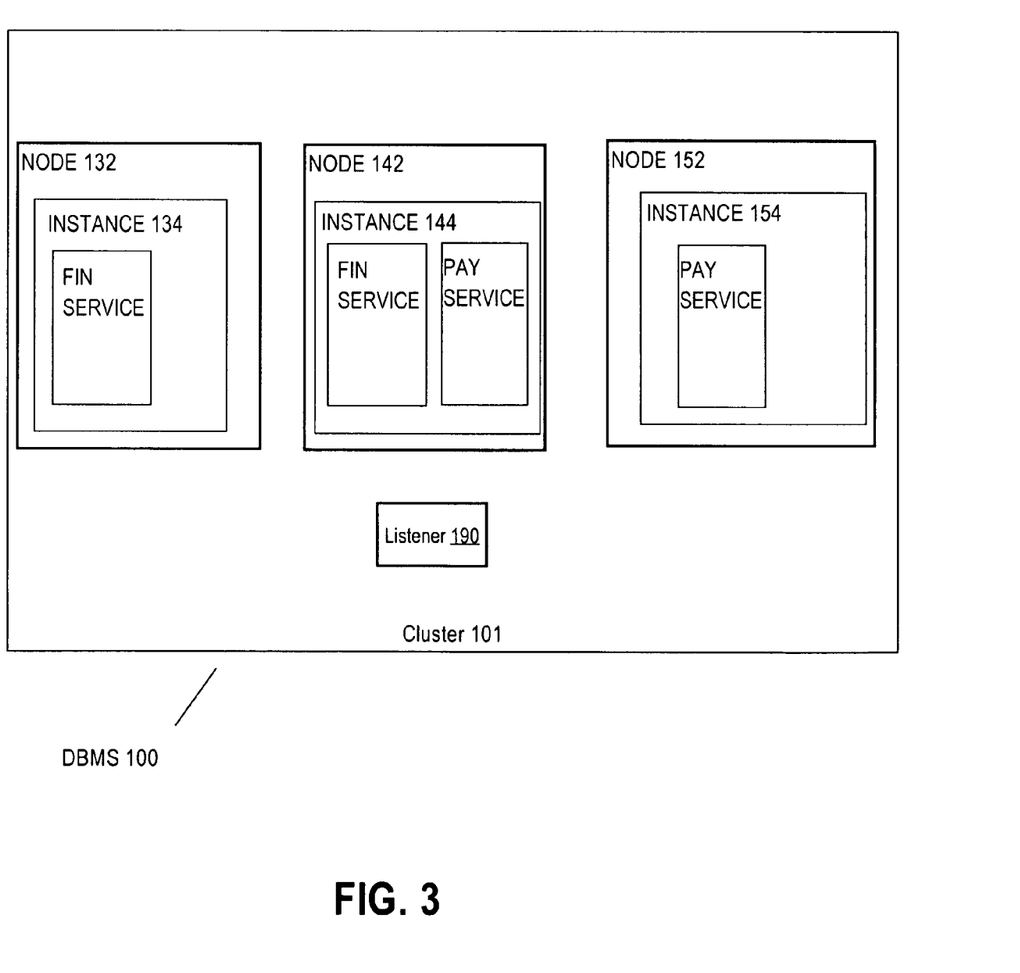
FIG. 3 is flow chart depicting services hosted by server instances according to an embodiment of the present invention.

Like any service, a database service may be further categorized. FIG. 3 depicts various services that may be hosted by cluster 101 and nodes within cluster 101.

Database services for database 110 are further categorized into the FIN service and PAY service. The FIN service is the database service performed by instances 134 and 144 for a FIN application. The PAY services are database services performed by instances 144 and 154 for a PAY application.

When migrating a session associated with service FIN from node 142, the session may be placed on instance 134, which hosts service FIN, but not placed on instance 154, which does not. When migrating a session associated with service PAY from node 142, the session may be placed on instance 154, which hosts service PAY, but not placed on instance 134, which does not.

If no other instance within cluster 101 is hosting a service associated with a session, then the session may not placed on another instance. This is a reason a session may not be migrated and may instead be terminated under a shutdown termination mode.

Another factor for session placement is load balancing. Among the set of instances to which sessions may be placed, the sessions should be distributed so as to balance the workload between the set of instances.

In an embodiment of the present invention, session placement and/or migration is managed, at least in part, by a process and/or module (e.g. listener 190) with sufficient information to account for the factors mentioned above or other factors.

To balance workload between services, a mechanism is needed to monitor and measure workload placed on various resources. According to an embodiment of the present invention, a workload monitor is hosted on each instance and generates "performance metrics". Performance metrics is data that indicates the level of performance for one or more resources or services based on performance measures. The performance metrics are available to the entity responsible for placing sessions, such as listener 190.

Other Kinds of Servers

An embodiment of the present invention has been illustrated by shutting a database server and migrating the sessions to another database server within a multi-node database server. However, an embodiment of the present invention is not so limited. For example, an embodiment of the present invention may be used to shut down an application server and migrate sessions to other application servers within a multi-node application server system. An example of an application server is an Oracle 9i Application Server or Oracle 10g Application Server. Therefore, it should be understood that an embodiment of the present invention is not limited to any particular kind of server.

HARDWARE OVERVIEW

Figure 4:
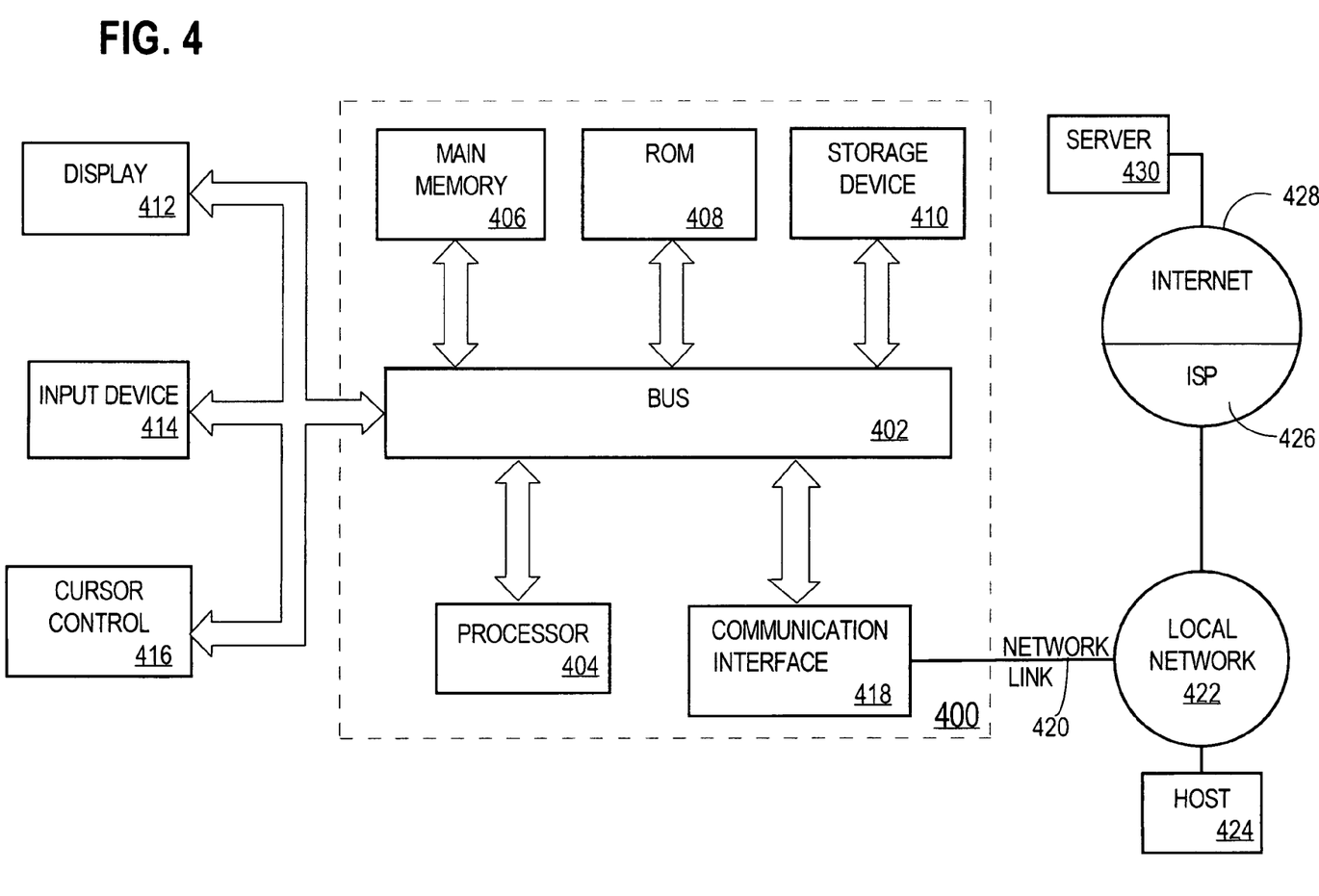
FIG. 4 is a diagram depicting a computer system that may be used in an implementation of an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a command requesting that a certain server hosted on a multi-node computer system be shutdown;
   wherein said multi-node computer system includes a plurality of nodes that host a plurality of servers, said plurality of servers including said certain server, each node of said plurality of nodes hosting a server of said plurality of servers; and
   in response to receiving said command:
   attempting to migrate a plurality of sessions from said certain server;
   after attempting to migrate said plurality of said sessions, determining to terminate one or more certain sessions of said plurality of sessions in lieu of migrating said one or more certain sessions; and
   shutting down said server after all of said plurality of said sessions have either been terminated or migrated.

2. The method of claim 1, wherein:
   a plurality of services are hosted on said multi-node computer system;
   a particular session of said plurality of sessions is associated with a particular service of said plurality of services; and
   the steps further include selecting a server to which to migrate said particular session based on one or more factors that include whether a destination server to which to migrate said particular session hosts said particular service.

3. A computer-readable storage medium carrying one or more sequences of instructions which, when executed by one or more processors, causes the one or more processors to perform the method recited in claim 2.

4. The method of claim 1, wherein:
   a plurality of services are hosted on said multi-node computer system;
   a particular session of said plurality of sessions is associated with a particular service of said plurality of services; and
   determining to terminate one or more certain sessions is based on determining that no other server hosts said particular session.

5. A computer-readable storage medium carrying one or more sequences of instructions which, when executed by one or more processors, causes the one or more processors to perform the method recited in claim 4.

6. The method of claim 1, wherein said command is a single statement conforming to a computer language.

7. A computer-readable storage medium carrying one or more sequences of instructions which, when executed by one or more processors, causes the one or more processors to perform the method recited in claim 6.

8. The method of claim 1, wherein said command is an invocation of a function or routine of an API.

9. A computer-readable storage medium carrying one or more sequences of instructions which, when executed by one or more processors, causes the one or more processors to perform the method recited in claim 8.

10. The method of claim 1, wherein the steps performed in response to receiving said command further include directing connection requests for sessions to servers other than said certain server.

11. A computer-readable storage medium carrying one or more sequences of instructions which, when executed by one or more processors, causes the one or more processors to perform the method recited in claim 10.

12. The method of claim 1, wherein said plurality of nodes hosts a plurality of database servers that include said certain server.

13. The method of claim 12, wherein said plurality of database servers manage access to a database.

14. A computer-readable storage medium carrying one or more sequences of instructions which, when executed by one or more processors, causes the one or more processors to perform the method recited in claim 13.

15. A computer-readable storage medium carrying one or more sequences of instructions which, when executed by one or more processors, causes the one or more processors to perform the method recited in claim 12.

16. The method of claim 1, wherein the steps performed in response to receiving said command further include migrating a subset of said plurality of sessions, wherein said migrating said subset includes balancing load on said subset of plurality of sessions.

17. A computer-readable storage medium carrying one or more sequences of instructions which, when executed by one or more processors, causes the one or more processors to perform the method recited in claim 16.

18. The method of claim 1,
wherein termination of said one or more certain sessions includes waiting for said one or more certain sessions to be user terminated; and
while said waiting, further attempting to migrate said one or more certain sessions.

19. A computer-readable storage medium carrying one or more sequences of instructions which, when executed by one or more processors, causes the one or more processors to perform the method recited in claim 18.

20. A computer-readable storage medium carrying one or more sequences of instructions which, when executed by one or more processors, causes the one or more processors to perform the method recited in claim 1.

* * * * *

UNITED STATES PATENT AND TRADEMARK OFFICE
CERTIFICATE OF CORRECTION

| | | |
|---|---|---|
| PATENT NO. | : 7,502,824 B2 | Page 1 of 1 |
| APPLICATION NO. | : 11/415557 | |
| DATED | : March 10, 2009 | |
| INVENTOR(S) | : Kaluskar et al. | |

It is certified that error appears in the above-identified patent and that said Letters Patent is hereby corrected as shown below:

In column 2, line 7, delete "the" and insert -- this --, therefor.

Signed and Sealed this

Eighteenth Day of May, 2010

David J. Kappos
*Director of the United States Patent and Trademark Office*